(12) United States Patent
Ueda et al.

(10) Patent No.: US 10,114,594 B2
(45) Date of Patent: Oct. 30, 2018

(54) PRINTING APPARATUS WITH AUTHENTICATION FUNCTION

(71) Applicant: RISO KAGAKU CORPORATION, Tokyo (JP)

(72) Inventors: Takaomi Ueda, Ibaraki (JP); Takahiro Fushimi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/712,775

(22) Filed: Sep. 22, 2017

(65) Prior Publication Data

US 2018/0095704 A1 Apr. 5, 2018

(30) Foreign Application Priority Data

Sep. 30, 2016 (JP) ................................. 2016-192752
Aug. 30, 2017 (JP) ................................. 2017-164975

(51) Int. Cl.
*G06F 3/12* (2006.01)

(52) U.S. Cl.
CPC .......... *G06F 3/1222* (2013.01); *G06F 3/1238* (2013.01); *G06F 3/1273* (2013.01); *G06F 3/1285* (2013.01)

(58) Field of Classification Search
CPC .... G06F 3/1222; G06F 3/1238; G06F 3/1273; G06F 3/1285

USPC ........................................................ 358/1.15
See application file for complete search history.

(56) References Cited

U.S. PATENT DOCUMENTS

| 2013/0198806 A1* | 8/2013 | Takatsu | G06F 3/1222 726/3 |
| 2014/0226175 A1* | 8/2014 | Fallon | G06F 21/608 358/1.14 |
| 2014/0253944 A1* | 9/2014 | Neville | H04N 1/00127 358/1.14 |

FOREIGN PATENT DOCUMENTS

JP 2002-109503 4/2002

* cited by examiner

*Primary Examiner* — Neil R McLean
(74) *Attorney, Agent, or Firm* — Greenblum & Bernstein, P.L.C.

(57) ABSTRACT

A controller performs a first processing including: at a predetermined timing, determining whether a first authentication code stored in a storage of a control board attached to a first control board attachment portion matches a second authentication code stored in a storage of a control board attached to a second control board attachment portion; upon determining that the first authentication code matches the second authentication code, allowing a printer to execute a print processing; and upon determining that the first authentication code does not match the second authentication code, prohibiting the printer from executing the print processing.

6 Claims, 12 Drawing Sheets

PRINTING APPARATUS WITH AUTHENTICATION FUNCTION

CROSS REFERENCE TO RELATED APPLICATION

This application is based upon and claims the benefit of priority from the prior Japanese Patent Application Nos. 2016-192752, filed on Sep. 30, 2016, and 2017-164975, filed on Aug. 30, 2017, the entire contents of which are incorporated herein by reference.

BACKGROUND

1. Technical Field

The disclosure relates to a printing apparatus which can authenticate multiple control boards in the printing apparatus without connecting to an external server.

2. Related Art

There is a printing apparatus which has one or more main body control boards configured to control a printing apparatus main body. In this printing apparatus, various devices in the printing apparatus main body are controlled according to control commands generated by computation circuits such as CPUs mounted on the one or more main body control boards.

Moreover, there is a printing apparatus provided with, in addition to the printing apparatus main body, a scanner configured to read an image from an original, an operation panel configured to receive user operations, and the like. In some cases, the control boards are mounted respectively in these scanner, operation panel, and the like.

There is a case where multiple control boards are mounted in the printing apparatus as described above. Unless proper control boards are mounted in the respective devices, the printing apparatus may have trouble in properly executing print operations, and this may lead to a decrease in printing quality of printed sheets.

Japanese Patent Application Publication No. 2002-109503 describes a technique relating to a network management system. In this technique, unique information stored in a unique information storage device is constantly compared with unique information in a fraud detection device, and a management server reads comparison results and rejects a connection request when finding an improper result among the read comparison results.

SUMMARY

In the case as in the technique described in Japanese Patent Application Publication No. 2002-109503 where the unique information stored in the unique information storage device is constantly compared with the unique information in the fraud detection device, and the management server reads the comparison results and rejects a connection request when finding the improper result among the read comparison results, the management server needs to constantly read the comparison results and determine whether the improper result exists among the read comparison results or not. Accordingly, when there are many devices to be managed by the management server, processing load, network load, and the like of the determination may be heavy.

Moreover, since the unique information stored in the unique information storage device and the unique information in the fraud detection device are compared on a one-to-one basis, the security level is low and the unique information can be easily falsified. Hence, even being applied to a printing apparatus in which multiple control boards are mounted, the technique described in Japanese Patent Application Publication No. 2002-109503 may be ineffective in preventing an improper control board from being mounted in the printing apparatus.

An object of the disclosure is to provide a printing apparatus which can appropriately authenticate multiple control boards in the printing apparatus without connecting to an external server.

A printing apparatus in accordance with some embodiments includes: a first control board attachment portion; a second control board attachment portion; a first control board having a first storage and attachable to the first control board attachment portion; a second control board having a second storage and attachable to the second control board attachment portion; a printer configured to execute a print processing according to an instruction from a control board attached to the first control board attachment portion; and a controller. The controller is configured to: obtain an authentication code from an external device, the authentication code being for use to allow the printer to execute the print processing; write the obtained authentication code into the first storage of the first control board attached to the first control board attachment portion and the second storage of the second control board attached to the second control board attachment portion; and perform a first processing. The first processing includes: at a predetermined timing, determining whether a first authentication code stored in a storage of the control board attached to the first control board attachment portion matches a second authentication code stored in a storage of a control board attached to the second control board attachment portion; upon determining that the first authentication code matches the second authentication code, allowing the printer to execute the print processing; and upon determining that the first authentication code does not match the second authentication code, prohibiting the printer from executing the print processing.

In the configuration described above, even if any of the control boards is replaced with an improper control board, the execution of print processing can be prohibited because no authentication code is stored or an improper authentication code is stored in the improper control board.

As a result, authentication can be performed with an improved security level in the printing apparatus without connecting to an external server.

The printing apparatus may further include a log information storage mounted on a portion of the printing apparatus other than the first control board and the second control board. The first processing may further include: collecting pieces of log information on the printing apparatus and storing the pieces of log information in the log information storage; determining whether a piece of log information satisfying a predetermined condition relating to an error during the print processing by the printer is included in the pieces of log information stored in the log information storage; and upon determining that the first authentication code does not match the second authentication code and upon determining that the piece of log information satisfying the predetermined condition is included in the pieces of log information stored in the log information storage, changing the predetermined timing so as to increase frequency of determining whether the first authentication code matches the second authentication code.

In the configuration described above, in the printing apparatus in which the improper control board has been used in the past, the matching between the first authentication code and the second authentication code is performed at high frequency, and mounting of the improper control board can be thus detected sooner. Hence, it is possible to replace the improper control board with the proper control board and thereby execute the printing without a decrease in quality of a print image.

The controller may include: a first CPU mounted on the first control board and configured to perform the first processing; a second CPU mounted on the second control board and configured to perform the first processing; and a third CPU mounted on a portion of the printing apparatus other than the first control board and the second control board and configured to perform a second processing. The second processing includes: at a predetermined timing, determining whether a determination whether the first authentication code stored in the storage of the control board attached to the first control board attachment portion matches the second authentication code stored in the storage of the control board attached to the second control board attachment portion has been performed; and upon determining that the determination whether the first authentication code matches the second authentication code has not been performed, prohibiting the printer from executing the print processing.

In the configuration described above, even if all of the control boards are replaced with the improper control boards, the execution of print processing can be prohibited.

The controller may include a CPU mounted on a portion of the printing apparatus other than the first control board and the second control board and configured to perform the first processing.

The controller may include: a first CPU mounted on the first control board and configured to perform the first processing; and a second CPU mounted on the second control board and configured to perform the first processing.

DETAILED DESCRIPTION

Figure 1:
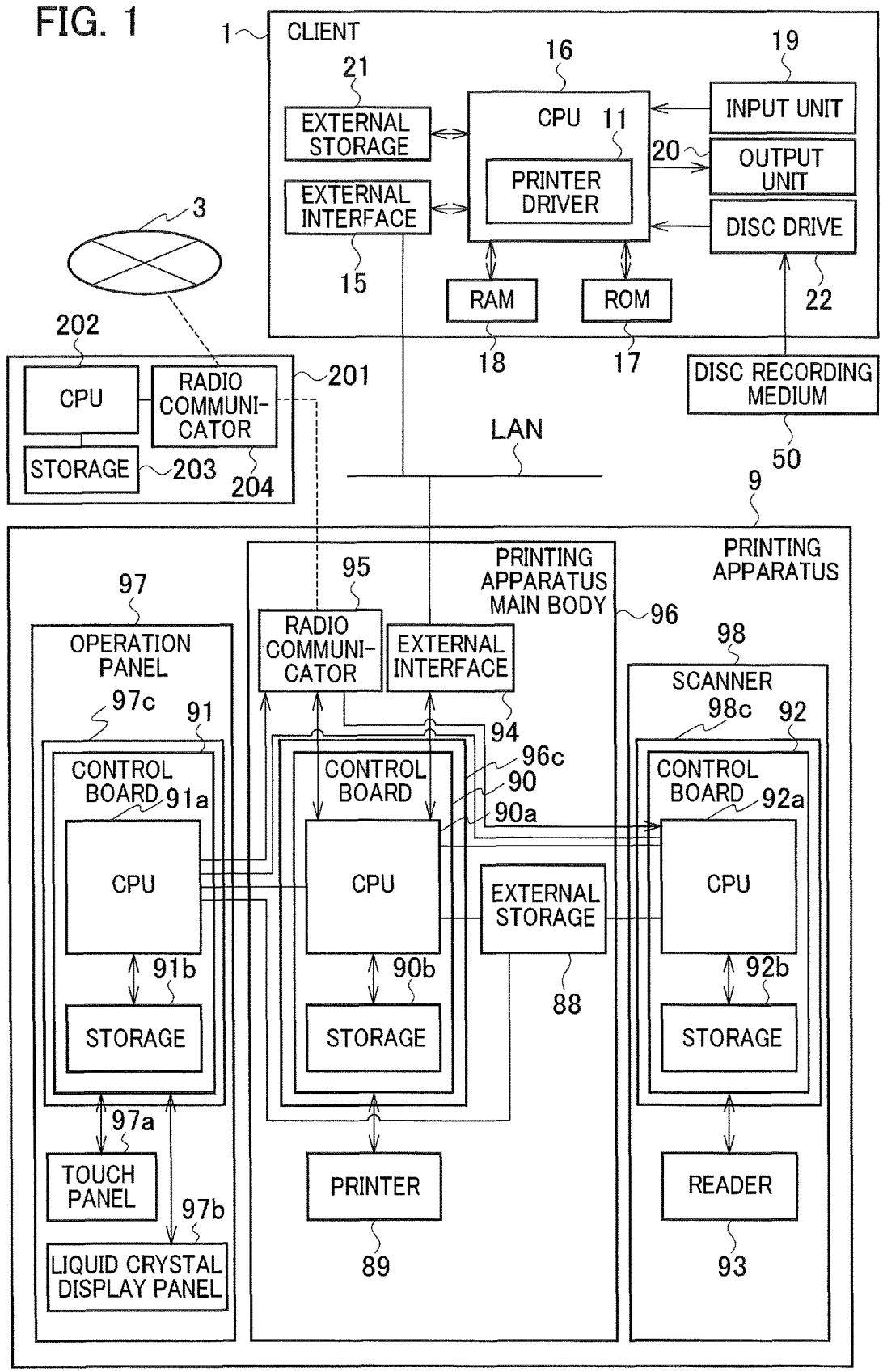
FIG. 1 is an explanatory diagram illustrating a schematic configuration of a printer network system including an inkjet printing apparatus in a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

First Embodiment

A printing apparatus in a first embodiment of the present disclosure is described below in detail with reference to the attached drawings. FIG. 1 is an explanatory diagram illustrating a schematic configuration of a printer network system including an inkjet printing apparatus 9 of the first embodiment.

Note that, in the first embodiment, description is given by using the inkjet printing apparatus 9 as an example of the printing apparatus. The printing apparatus 9 includes multiple ink heads in which many nozzles are formed and performs printing in units of lines by ejecting a black or color ink from each ink head and forming multiple images on a recording sheet on a conveyer belt such that the images are superimposed on one another.

Overall Configuration of Printer Network System

As illustrated in FIG. 1, the printer network system of the first embodiment includes the printing apparatus 9 configured to form an image on a print sheet, multiple clients 1 (in FIG. 1, only one client 1 is illustrated as a representative) connected to the printing apparatus 9 via a network LAN, and a mobile terminal 201 configured to wirelessly communicate with the printing apparatus 9.

The network LAN is a 10BASE-T, 100BASE-TX, or similar local area network (LAN) or a wireless network such as a wireless LAN (WLAN) which uses a communication protocol TCP/IP. The network LAN also includes simple networks such as, for example, a peer-to-peer home network.

Each client 1 consists of a general-purpose computer such as a personal computer (PC). The client 1 includes a CPU 16 configured to execute various types of processing based on a control program. The CPU 16 is connected to a RAM 18 configured to function as a working area, a ROM 17 configured to store data, and the like, and is also connected to various devices via various interfaces. Specifically, the CPU 16 is connected via the various interfaces to an input unit 19 which includes a keyboard, a mouse, and the like, an output unit 20 which includes a liquid crystal display and the like, an external storage 21 such as a mass storage device which includes a HDD, a semiconductor memory, and the like, a disc drive 22 which reads data recorded in a disc recording medium 50 and writes predetermined data into the disc recording medium 50, and the like.

In the external storage 21, there are secured a storage region for an application program which is used to generate original data including print images of documents, images, and the like, a storage region for a printer driver program of the printing apparatus 9, and a storage region for other various application programs. In the external storage 21, there is also secured a database region which stores a print job including a file (original data) generated by using the application program and print setting information of this file. Here, the print setting information includes information required for normal printing such as a print mode, the size of the original data, the resolution, the size of the print sheet, and a print direction.

The CPU 16 is a computation device consisting of a processor, a memory, and other peripheral units, and activates the application programs in the external storage 21 according to activation requests inputted on the input unit 19. Moreover, the CPU 16 generates the original data on the activated application programs, the original data indicating an image specified through parameter input or the like performed on the input unit 19. The generated original data is outputted to and displayed on the output unit 20. Moreover, when a save request is inputted on the input unit 19, the generated original data is stored in the database region of the external storage 21.

When a read request for the original data stored in the database region of the external storage 21 is inputted on the input unit 19 while the application program is active, the original data is read from the external storage 21. The image of the read original data can be outputted to and displayed on the output unit 20 and processed on the application program to be regenerated into new original data.

When the CPU 16 receives an input of a print request for the original data generated on the original application program or the like, the CPU 16 executes the printer driver program and virtually constructs a printer driver 11 on the CPU 16. Then, the printer driver 11 outputs the print job including this original data to the printing apparatus 9. The printer driver 11 is a data conversion program which is executed on the client 1 to control the printing apparatus 9 connected to the client 1. When a user performs an operation of print request, the printer driver 11 obtains the original data including the print image generated by the original application program or the like and generates the print job including the obtained original data and the predetermined print setting information. Then, the printer driver 11 outputs the generated print job from an external interface 15 to the printing apparatus 9.

The mobile terminal 201 consists of a smartphone, a tablet computer, or the like. The mobile terminal 201 includes a CPU 202 configured to execute various types of processing based on a control program. The CPU 202 is connected to a storage 203 configured to store an authentication code and a radio communicator 204 configured to wirelessly communicate with the printing apparatus 9. The storage 203 consists of a storage device such as a HDD, a semiconductor memory, or the like.

The CPU 202 connects to the Internet 3 via the radio communicator 204 to download the authentication code and stores the authentication code obtained by the download in the storage 203. Then, the CPU 202 sends the authentication code stored in the storage 203 to the printing apparatus 9 via the radio communicator 204.

The printing apparatus 9 is a color inkjet printer that includes multiple ink heads in which many nozzles are formed and that forms an image on a print medium by performing printing in units of lines by ejecting a black or color ink from each ink head and forming multiple images on the print medium on a conveyer belt such that the images are superimposed on one another.

In the first embodiment, the printing apparatus 9 includes a scanner 98 configured to read image information on an original as the print image and output an image signal, an operation panel 97 configured to display operation information on processing functions to be performed in the printing apparatus 9 and receive user operations including instructions related to a printing operation, and a printing apparatus main body 96 configured to print (record) the print image on a recording sheet (on one side or both sides) based on the image data outputted from the scanner 98 or the print job sent from the client 1. The recording sheet used in the printing of the print image in the printing apparatus main body 96 is conveyed from a not-illustrated sheet feeder to a not-illustrated sheet discharger via the printing apparatus main body 96 or an external device.

The printing apparatus main body 96 is provided with an external interface 94, a radio communicator 95, a control board 90, a printer 89, and an external storage (log information storage) 88.

The external interface 94 of the printing apparatus main body 96 is connected to the external interfaces 15 of the multiple clients 1 via the local area network LAN.

The radio communicator 95 establishes connection with the mobile terminal 201 through wireless communication and receives the authentication code from the mobile terminal 201.

The external storage 88 consists of a storage device such as a HDD, a semiconductor memory, or the like. The external storage 88 is provided with multiple regions in which the print jobs and the setting information received from the clients 1 via the external interface 94 are stored. The external storage 88 functions as a print job storage in which the print jobs sent from the clients 1 are stored. The external storage 88 also stores pieces of log information collected by a log information collector 108 to be described later. The pieces of log information includes, in addition to a history log of print processing, various sensor detection errors, communication errors among the control boards, and the like.

The printer 89 includes the multiple ink heads in which the many nozzles are formed, and performs printing in units of lines by ejecting the black or color ink from each ink head based on an instruction from the control board 90.

The control board 90 is attached to a control board attachment portion 96c provided in the printing apparatus main body 96. The control board 90 includes a CPU 90a and a storage 90b. The storage 90b consists of a storage device such as a HDD, a semiconductor memory, or the like.

The CPU 90a is a computation processing device consisting of hardware such as a processor (for example, a CPU, a digital signal processor (DSP), or the like), a memory, and other electronic circuits, software such as a program having functions of the hardware, or combination of these hardware and software. The CPU 90a virtually constructs various function modules by appropriately reading and executing the program and performs processing related to the image data and various types of processing for operation control of the units and user operations. Moreover, the CPU 90a controls operations of the printer 89 based on the program and the setting information stored in the storage 90b.

Furthermore, the CPU 90a writes the authentication code received via the radio communicator 95 into the storage 90b and obtains the authentication codes stored in storages 91*b*, 92*b* included in other control boards 91, 92 via CPUs 91*a*, 92*a* included in the other control boards 91, 92 to compare the authentication code stored in the storage 90*b* with the authentication codes stored in the storages 91*b*, 92*b* included in the other control boards 91, 92 as will be described later. The communication between the CPU 90*a* and the CPUs 91*a*, 92*a* of the other control boards 91, 92 may be wireless communication or wired communication.

Moreover, the authentication code is stored in the storage 90*b* as described above.

The scanner 98 is provided with the control board 92 and a reader 93.

The reader 93 optically reads the original by using lenses, a CCD, and the like and outputs the read original as electric signals (image data).

The control board 92 is attached to a control board attachment portion 98*c* provided in the scanner 98. The control board 92 includes the CPU 92*a* and the storage 92*b*. The storage 92*b* consists of a storage device such as a HDD, a semiconductor memory, or the like.

The CPU 92*a* is a computation processing device consisting of hardware such as a processor (for example, a CPU, a digital signal processor (DSP), or the like), a memory, and other electronic circuits, software such as a program having functions of the hardware, or combination of these hardware and software. Moreover, the CPU 92*a* causes the reader 93 to read the image data based on the program stored in the storage 92*b*. The read image data is processed based on a predetermined command (enlarge, reduce, or the like) and is sent out to the printer 89.

Furthermore, the CPU 92*a* writes the authentication code received via the radio communicator 95 into the storage 92*b* and obtains the authentication codes stored in storages 90*b*, 91*b* included in the other control boards 90, 91 via the CPUs 90*a*, 91*a* included in the other control boards 90, 91 to compare the authentication code stored in the storage 92*b* with the authentication codes stored in the storages 90*b*, 91*b* included in the other control boards 91, 92 as will be described later. The communication between the CPU 92*a* and the CPUs 90*a*, 91*a* of the other control boards 90, 91 may be wireless communication or wired communication.

Moreover, the authentication code is stored in the storage 92*b* as described above.

The operation panel 97 is arranged in an upper portion of the printing apparatus 9. The operation panel 97 includes a transparent capacitance or pressure-sensitive touch panel 97*a* arranged on a front surface of the operation panel 97 and a liquid crystal display panel 97*b* provided on a back surface of the touch panel 97*a* and configured to display various operation screens. The user can utilize the operation panel 97 as an input operation unit or the like on which the user inputs setting conditions such as the number of copies to be printed in the case where the print image set on the scanner 98 is to be copied and printed or in the case where the print job received from the client 1 is to be printed.

Moreover, the control board 91 is attached to a control board attachment portion 97*c* provided in the operation panel 97. The control board 91 includes the CPU 91*a* and the storage 91*b*. The storage 91*b* consists of a storage device such as a HDD, a semiconductor memory, or the like.

The CPU 91*a* is a computation processing device consisting of hardware such as a processor (for example, a CPU, a digital signal processor (DSP), or the like), a memory, and other electronic circuits, software such as a program having functions of the hardware, or combination of these hardware and software. The CPU 91*a* controls the touch panel 97*a* and the liquid crystal display panel 97*b* based on the program stored in the storage 91*b*.

Moreover, the CPU 91*a* writes the authentication code received via the radio communicator 95 into the storage 91*b* and obtains the authentication codes stored in storages 90*b*, 92*b* included in the other control boards 90, 92 via the CPUs 90*a*, 92*a* included in the other control boards 90, 92 to compare the authentication code stored in the storage 91*b* with the authentication codes stored in the storages 90*b*, 92*b* included in the other control boards 90, 92 as will be described later. The communication between the CPU 91*a* and the CPUs 90*a*, 92*a* of the other control boards 90, 92 may be wireless communication or wired communication.

Moreover, the authentication code is stored in the storage 91*b* as described above.

Configuration on CPU 90*a*

Figure 2:
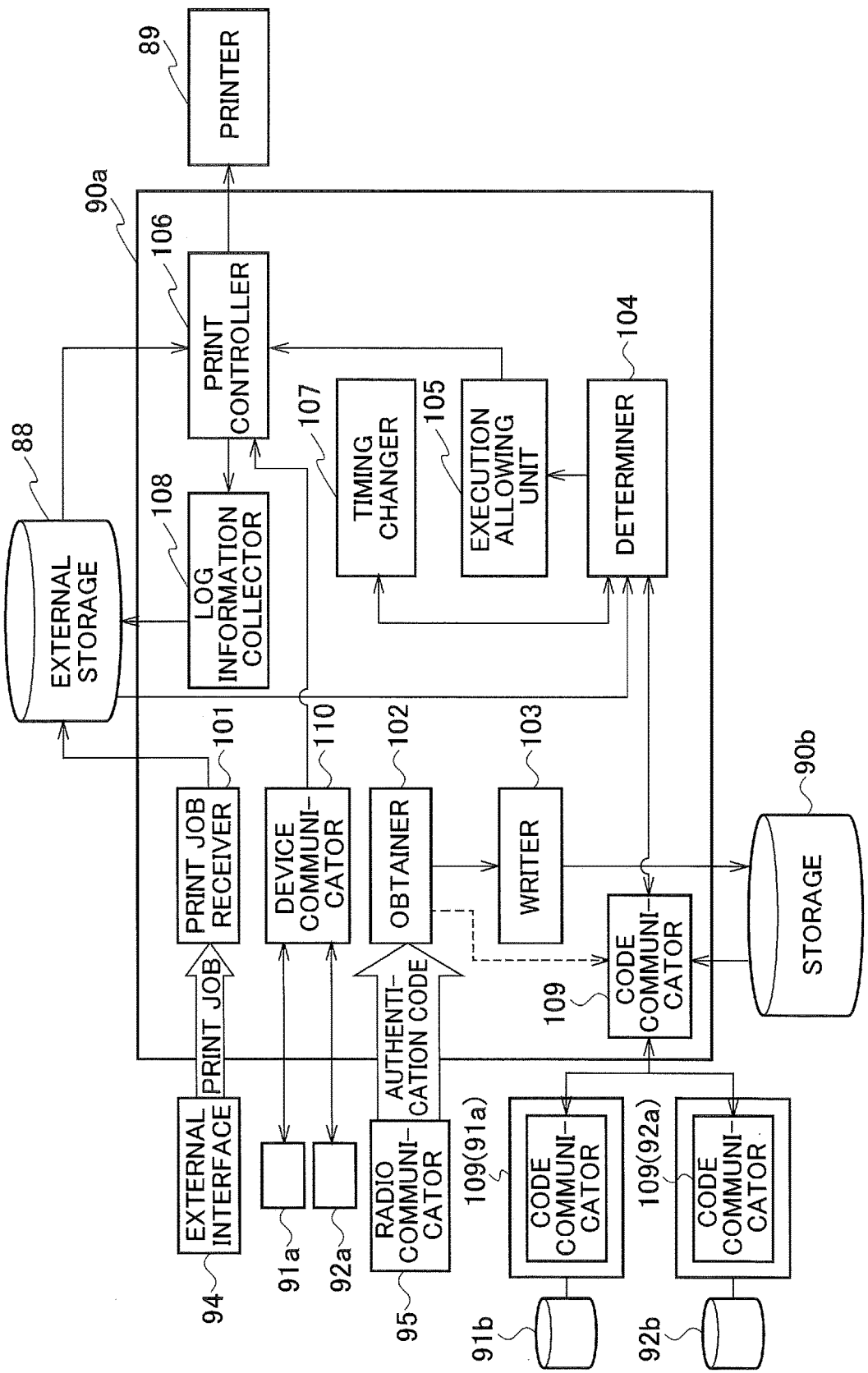
FIG. 2 is a block diagram illustrating an internal configuration which is virtually constructed on a CPU included in the printing apparatus of the first embodiment.

Next, internal blocks on the CPU 90*a* are described. FIG. 2 is a block diagram illustrating an internal configuration which is virtually constructed on the CPU 90*a* included in the printing apparatus 9 of the first embodiment of the present disclosure. Note that the term "module" used in the first embodiment refers to a function unit which consists of hardware such as devices and machines, software having functions of the hardware, a combination of these hardware and software, or the like and which implements a predetermined operation.

On the CPU 90*a*, there are provided a print job receiver 101, an obtainer 102, a writer 103, a determiner 104, an execution allowing unit 105, a timing changer 107, the log information collector 108, a print controller 106, a code communicator 109, and a device communicator 110.

The print job receiver 101 is a communication interface which receives the print job including the original data and the print setting information, and is a module which stores the received print job in the external storage 88.

The obtainer 102 obtains the authentication code which is used to allow the printer 89 to perform the print processing, from the mobile terminal 201, for example, when a service personnel performs an operation of requesting download of the authentication code on the mobile terminal 201 in initial setting.

The writer 103 writes the authentication code obtained by the obtainer 102 into the storage 90*b* of the control board 90. As will be described later, the writer 103 included in the CPU 91*a* writes the authentication code obtained by the obtainer 102 included in the CPU 91*a* into the storage 91*a* of the control board 91. Moreover, the writer 103 included in the CPU 92*a* writes the authentication code obtained by the obtainer 102 included in the CPU 92*a* into the storage 92*b* of the control board 92.

As described above, when the control boards 90 to 92 obtain the authentication code from the mobile terminal 201, the same authentication code is stored in the storages 90*b*, 91*b*, 92*b* of the control boards 90 to 92. Accordingly, if any of the control boards 90 to 92 is replaced with an improper control board, no authentication code is stored or an improper authentication code is stored in the improper control board.

Hence, it is possible to check whether any of the control boards 90 to 92 is replaced with the improper control board or not by checking whether the authentication code stored in the storages 90*b*, 91*b*, 92*b* are all the same or not at a predetermined timing.

Upon receiving a request from any of the CPUs 91*a*, 92*a* of the other control boards 91, 92 to send the authentication code, the code communicator 109 sends the authentication code stored in the storage 90b to the any of the CPUs 91a, 92a of the other control boards 91, 92 which has sent the request. Moreover, upon receiving a request from the determiner 104 to obtain the authentication codes at the predetermined timing, the code communicator 109 communicates with the CPUs 91a, 92a to obtain the authentication codes written in the storages 91b, 92b of the control boards 91, 92 and supplies the obtained authentication codes to the determiner 104.

The determiner 104 reads the authentication code written in the storage 90b and obtains the authentication codes written in the storages 91b, 92b of the other control boards 91, 92 via the code communicator 109, at the predetermined timing. Then, the determiner 104 determines whether the authentication codes written in the storages 90b, 91b, 92b are all the same or not. When proper control boards are used, the authentication codes stored in the storages of all control boards are the same due to the authentication code write processing by the writers 103. However, for example, assume that one of the control boards 90 to 92 is replaced with the improper control board. In this case, no authentication code is stored or the improper authentication code is stored in the improper control board. Accordingly, not all of the authentication codes are the same, that is, there is a control board which has a storage storing an authentication code different from the other authentication codes.

The execution allowing unit 105 allows the printer 89 to execute the print processing when the determiner 104 determines that the authentication codes written in the storages 90b, 91b, 92b are all the same. On the contrary, the execution allowing unit 105 prohibits the printer 89 from executing the print processing when the determiner 104 determines that an authentication code different from the other authentication codes exists among the authentication codes written in the storages 90b, 91b, 92b.

The timing changer 107 changes the predetermined timing from a normal timing to a high-frequency timing so as to increase the frequency of the determination by the determiner 104, when an authentication code different from the other authentication codes are included in the authentication codes written in the storages 90b, 91b, 92b and a piece of log information satisfying a predetermined condition is included in the pieces of log information stored in the external storage 88. In this case, the normal timing is any of a timing of power-on, a regular timing which comes once every month, and a timing of recovering from a power saving mode. Moreover, the high-frequency timing is any of the timing of power-on, a regular timing which comes twice every month, and the timing of recovering from the power saving mode.

The piece of log information satisfying the predetermined condition is a piece of log information which can be an evidence of continuance of printing using the improper control board, and is, for example, any of various sensor detection errors and communication errors among the control boards. When any of the proper control boards is replaced with the improper control board, data cannot be properly (appropriately) exchanged between the proper control boards and the improper control board and the communication errors are thus stored as the piece of log information. Moreover, when any of the proper control boards is replaced with the improper control board, detection signals cannot be properly (appropriately) obtained from various sensors connected to the improper control board and the sensor detection errors are thus stored as the piece of log information. Then, when a piece of log information indicating restore of the printing apparatus 9 is stored after the detection of the communication errors and the various sensor detection errors, it is possible to assume that the improper control board has been used once but an error has occurred and the printing has been continued by forcedly cancelling the error or by performing a similar operation. Accordingly, when the piece of log information such as the communication errors and the various sensor detection errors is stored among the pieces of log information and the piece of log information indicating recovery of the printing apparatus 9 is stored after the detection of these errors, the timing changer 107 determines that the piece of log information which can be the evidence of printing using the improper control board is stored, that is the piece of log information satisfying the predetermined condition is stored.

The log information collector 108 collects pieces of log information of the printing apparatus 9 and stores the pieces of log information in the external storage 88.

The print controller 106 is a module which controls operations of drive units such as drive of the inkjet heads of the respective colors, a sheet feed route, a conveyance route, a sheet discharge route, and the like and which controls overall image formation processing. The print controller 106 forms an image at a timing and print speed according to scheduling. More specifically, the print controller 106 performs printing in units of lines by ejecting zero to seven droplets of ink from each inkjet head to the conveyed sheet, based on an operation signal obtained from the operation panel 97 and the image data included in the print job stored in the external storage 88.

The device communicator 110 communicates with the CPU 91a and the CPU 92a to receive signals which allow or prohibit the execution of printing by the printer 89, from the CPU 91a and the CPU 92a, and supplies the signals to the print controller 106.

Configuration on CPU 91a

Figure 3:
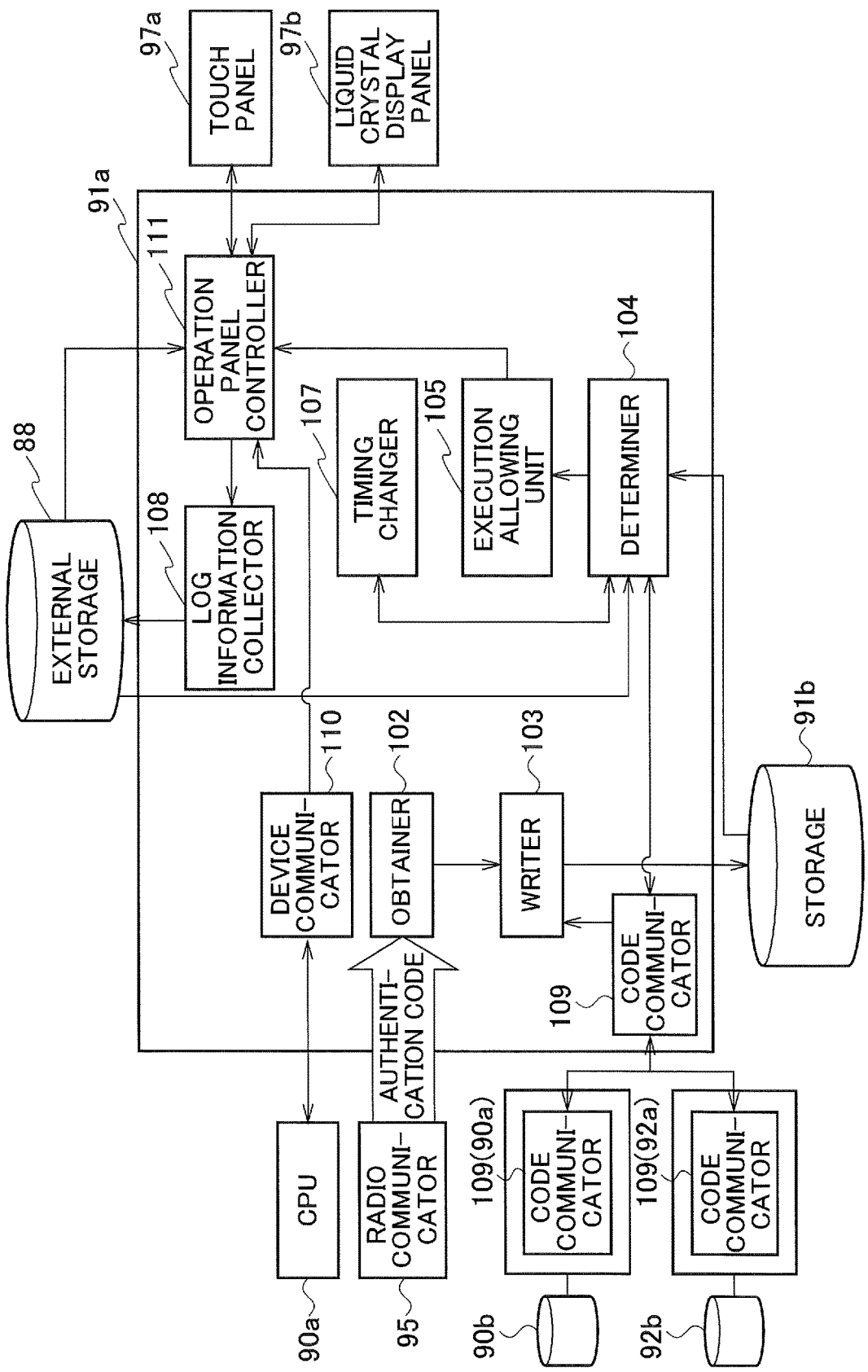
FIG. 3 is a block diagram illustrating an internal configuration which is virtually constructed on a CPU included in the printing apparatus of the first embodiment.

Next, internal blocks on the CPU 91a are described. FIG. 3 is a block diagram illustrating an internal configuration which is virtually constructed on the CPU 91a included in the printing apparatus 9 of the first embodiment of the present disclosure.

As illustrated in FIG. 3, on the CPU 91a, there are provided the obtainer 102, the writer 103, the determiner 104, the execution allowing unit 105, the timing changer 107, the log information collector 108, the code communicator 109, the device communicator 110, and an operation panel controller 111. Note that the configurations denoted by the same reference numerals as those in FIG. 2 out of the configurations illustrated in FIG. 3 have the same functions as the configurations in FIG. 2, and description thereof is thus omitted as appropriate.

The operation panel controller 111 controls the touch panel 97a and the liquid crystal display panel 97b to display the operations screens on the liquid crystal display panel 97b and receive the operation signals from the touch panel 97a.

The writer 103 writes the authentication code obtained by the obtainer 102 into the storage 91b of the control board 91.

The determiner 104 reads the authentication code written in the storage 91b and obtains the authentication codes written in the storages 90b, 92b of the other control boards 90, 92 via the code communicator 109, at the predetermined timing. Then, the determiner 104 determines whether the authentication codes written in the storages 90b, 91b, 92b are all the same or not.

Configuration on CPU 92a

Figure 4:
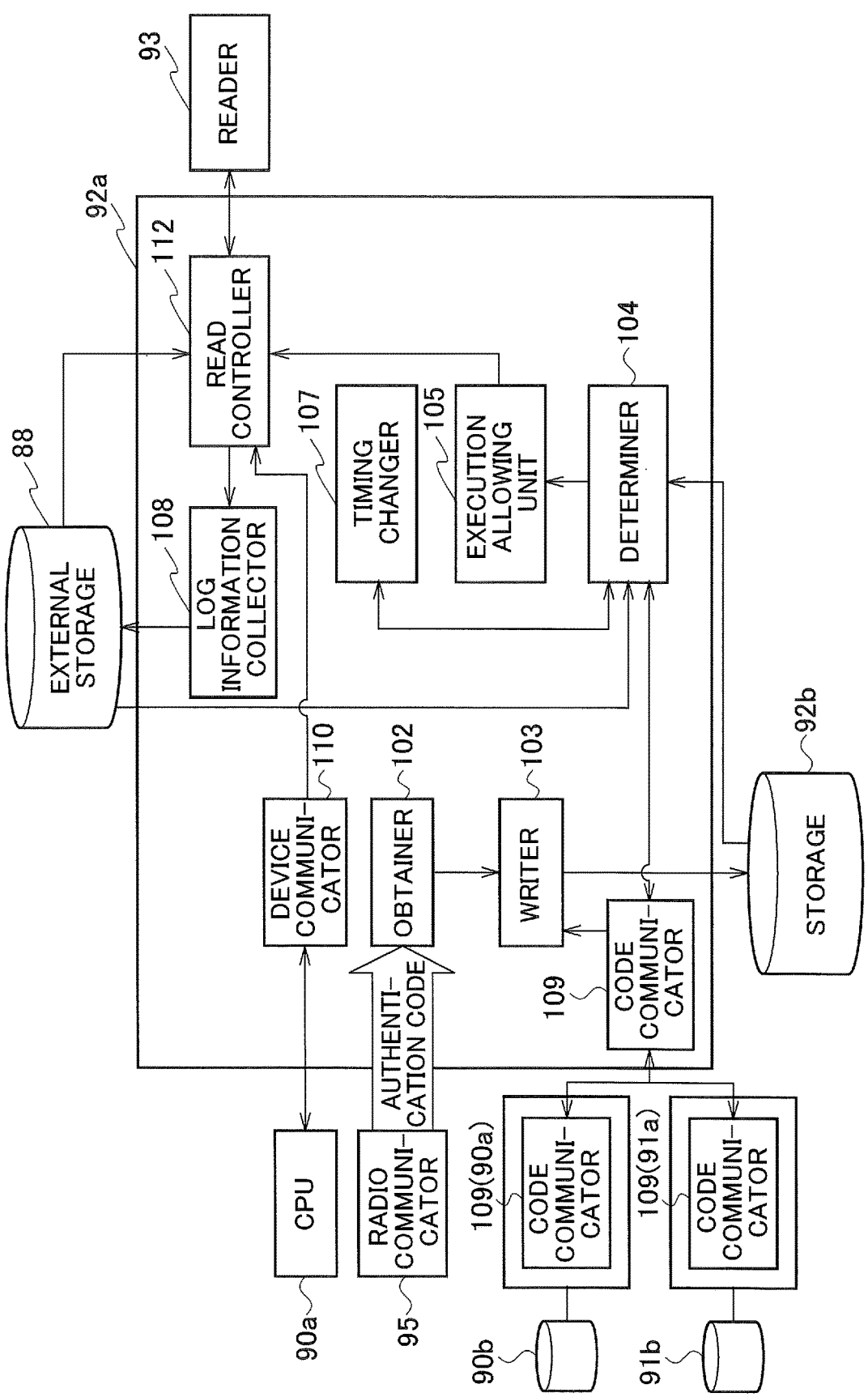
FIG. 4 is a block diagram illustrating an internal configuration which is virtually constructed on a CPU included in the printing apparatus of the first embodiment.

Next, internal blocks on the CPU 92a are described. FIG. 4 is a block diagram illustrating an internal configuration which is virtually constructed on the CPU 92a included in the printing apparatus 9 of the first embodiment of the present disclosure.

As illustrated in FIG. 4, on the CPU 92a, there are provided the obtainer 102, the writer 103, the determiner 104, the execution allowing unit 105, the timing changer 107, the log information collector 108, the code communicator 109, the device communicator 110, and a read controller 112. Note that the configurations denoted by the same reference numerals as those in FIG. 2 out of the configurations illustrated in FIG. 4 have the same functions as the configurations in FIG. 2, and description thereof is thus omitted as appropriate.

The read controller 112 controls the reader 93 and sends the image data read by the reader 93 to the CPU 90a via the device communicator 110.

The writer 103 writes the authentication code obtained by the obtainer 102 into the storage 92b of the control board 92.

The determiner 104 reads the authentication code written in the storage 92b and obtains the authentication codes written in the storages 90b, 91b of the other control boards 90, 91 via the code communicator 109, at the predetermined timing. Then, the determiner 104 determines whether the authentication codes written in the storages 90b, 91b, 92b are all the same or not.

Next, operations of the printing apparatus 9 of the first embodiment are described. Note that although description is given herein by using the CPU 90a of the control board 90 as an example, the CPU 91a of the control board 91 and the CPU 92a of the control board 92 also execute similar processing.

Authentication Code Write Processing

Figure 5:
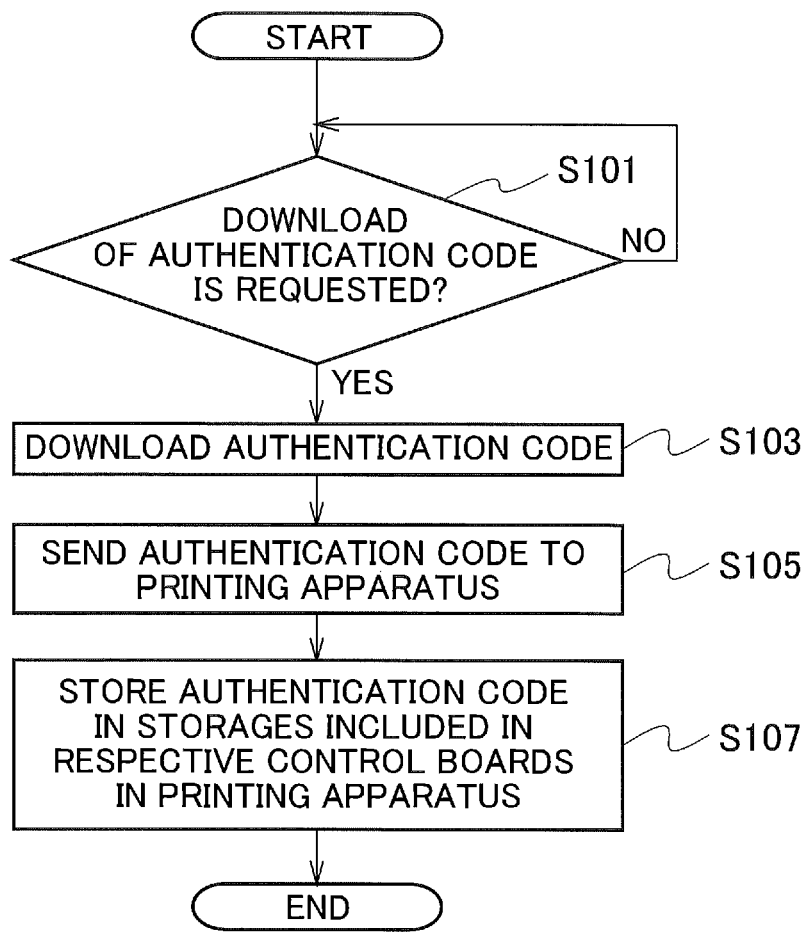
FIG. 5 is a flowchart illustrating authentication code write processing in the printing apparatus of the first embodiment.

FIG. 5 is a flowchart illustrating authentication code write processing in the printing apparatus 9 of the first embodiment.

As illustrated in FIG. 5, when the service personnel performs an operation of requesting download of the authentication code on the mobile terminal 201 (YES in step S101), the CPU 202 of the mobile terminal 201 connects to the Internet 3 via the radio communicator 204 and downloads the authentication code (step S103). A site from which the authentication code is downloaded is, for example, a homepage of a manufacturer and authentication using a user ID and a password registered in advance allows the download of the authentication code. The authentication code obtained in the download is stored in the storage 203.

The mobile terminal 201 then sends the authentication code stored in the storage 203 to the printing apparatus 9 via the radio communicator 204 (step S105).

When the printing apparatus 9 receives the authentication code from the mobile terminal 201 via the radio communicator 95, the printing apparatus 9 stores the received authentication code in the storage 91b of the control board 91, the storage 90b of the control board 90, and the storage 92b of the control board 92 (step S107).

Print Allowing Determination Processing

Figure 6:
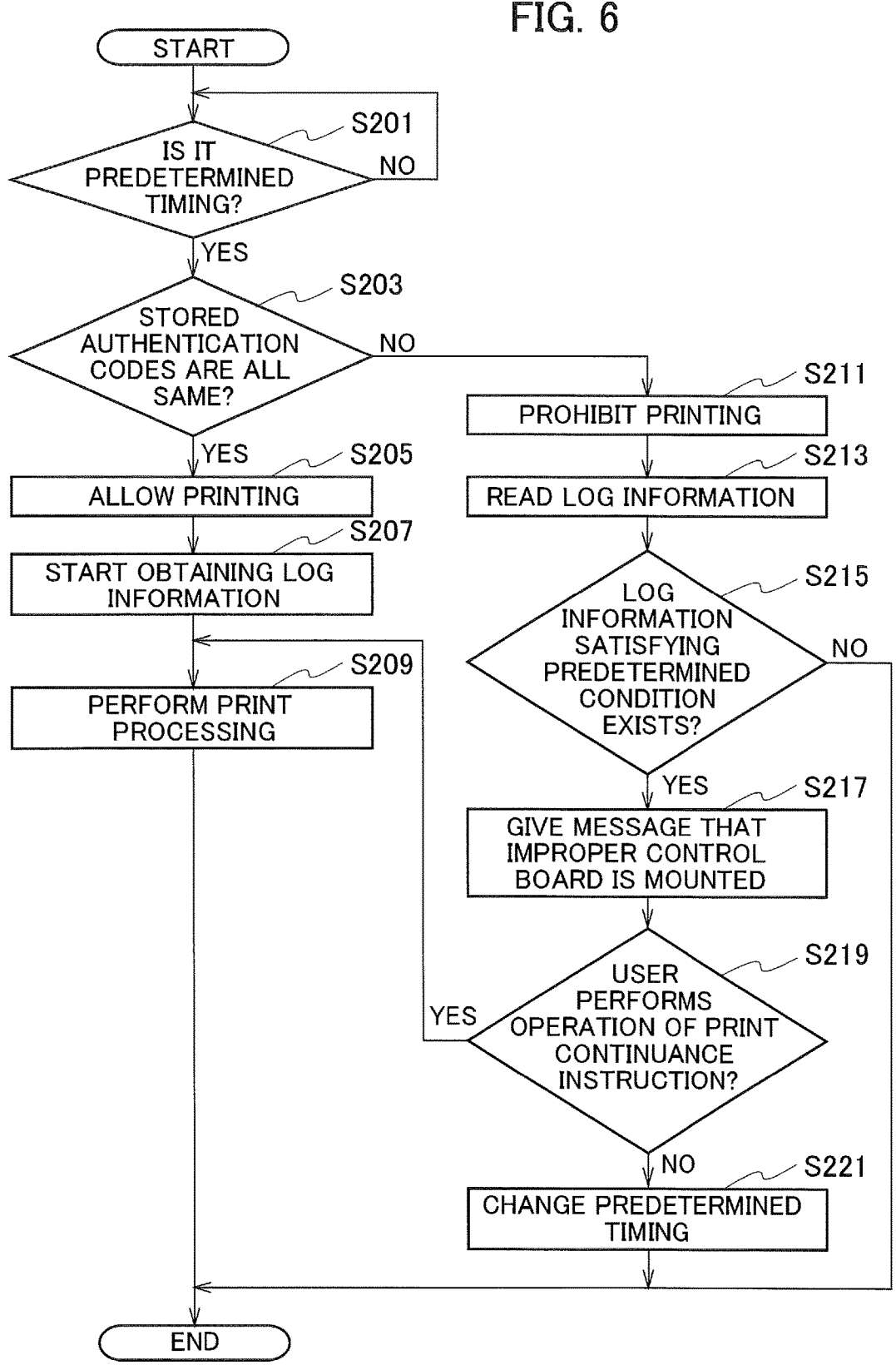
FIG. 6 is a flowchart illustrating print allowing determination processing in the printing apparatus of the first embodiment.

FIG. 6 is a flowchart illustrating print allowing determination processing in the printing apparatus 9 of the first embodiment.

As illustrated in FIG. 6, when it is the predetermined timing (S201), the determiner 104 of the CPU 90a determines whether the authentication code stored in the storage 90b of the control board 90, the authentication code stored in the control board attached to the control board attachment portion 97c, and the authentication code stored in the control board attached to the control board attachment portion 98c are all the same or not (step S203). In this case, if the control board attached to the control board attachment portion 97c is the control board 91 and the control board attached to the control board attachment portion 98c is the control board 92, the determiner 104 of the CPU 90a determines whether the authentication code stored in the storage 90b of the control board 90, the authentication code stored in the storage 91b of the control board 91, and the authentication code stored in the storage 92b of the control board 92 are all the same or not.

When the determiner 104 determines that the authentication codes are all the same (YES in step S203), this means that the proper control boards are used. Accordingly, the execution allowing unit 105 allows printing (step S205).

Next, the log information collector 108 starts to collect pieces of log information (step S207) and the print controller 106 executes the print processing based on the print job stored in the external storage 88 (step S209).

Meanwhile, when the determiner 104 determines that not all of the authentication codes are the same, that is an authentication code different from the authentication code stored in the storage 90b of the control board 90 exists (NO in step S203), there is a possibility that the improper control board is used.

Accordingly, the execution allowing unit 105 prohibits the execution of printing (step S211). For example, the execution allowing unit 105 of the CPU 90a stops execution of processing by the print controller 106. Moreover, the execution allowing units 105 of the CPU 91a and the CPU 92a prohibit the execution of printing by blocking information to and from the control board determined to have the authentication code different from the other authentication codes or by stopping the operation of the external interface 94.

The timing changer 107 reads the pieces of log information from the external storage 88 (step 213) and determines whether the piece of log information satisfying the predetermined condition exists in the pieces of log information or not (step S215).

When the timing changer 107 determines that the piece of log information satisfying the predetermined condition exists in the pieces of log information (YES in step S215), the timing changer 107 notifies the user that the improper control board is mounted, and displays a screen asking the user whether to continue the printing or not, on the liquid crystal display panel 97b (step S217). Since the timing changer 107 notifies the user that the improper control board is mounted and asks the user whether to continue the printing or not as described above, the user can select either to call the service personnel and instruct him/her to replace the improper control board with the proper control board or to continue using this control board while bearing with low print quality of a printed sheet.

When the user performs an operation of print continuance instruction (YES in step S219), it is possible to assume that the user desires to continue using this control board while bearing with a low print quality of a printed sheet. Accordingly, the CPU 90a continues the printing (step S209).

On the contrary, when the user performs no operation of print continuance instruction (NO in step S219), it is possible to assume that the user desires to stop the printing and request replacement of the improper control board with the proper control board. Accordingly, the timing changer 107 changes the predetermined timing in step S201 so as to increase the frequency of the determination by the determiner 104 without continuing the printing (step S221) and terminates the processing.

Figure 7:
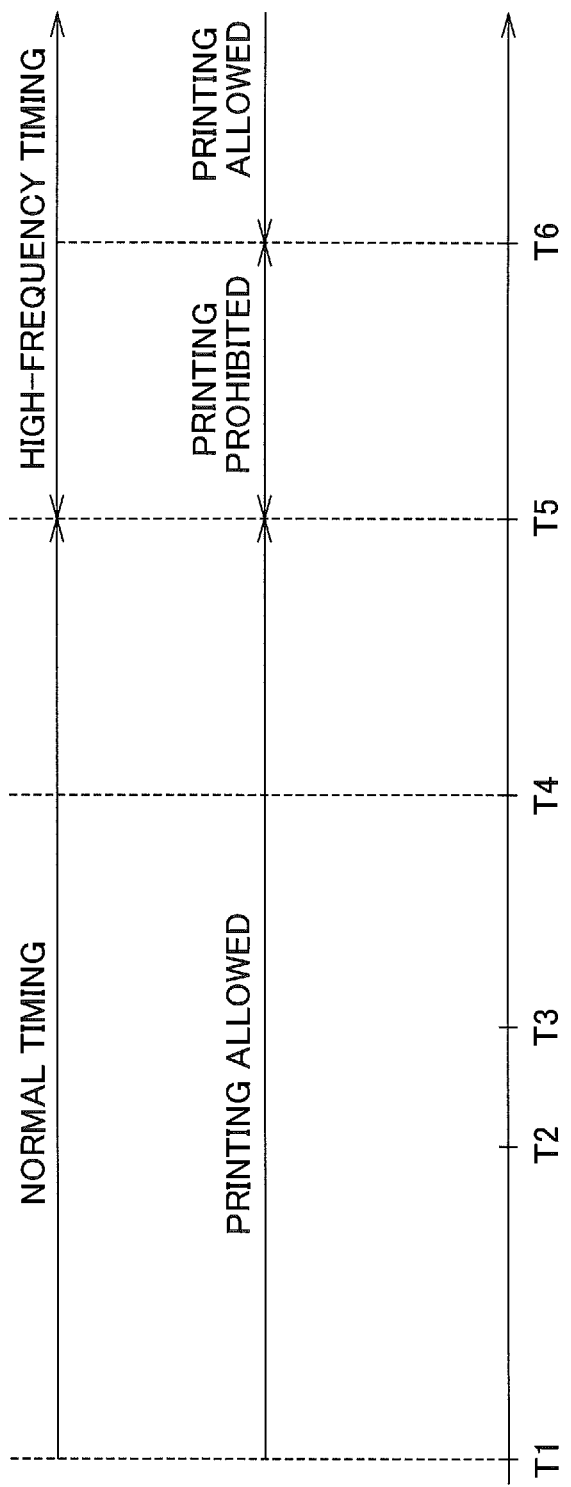
FIG. 7 is a timing chart illustrating an example of processing in the printing apparatus of the first embodiment in time-series.

FIG. 7 is a timing chart illustrating an example of processing in the printing apparatus 9 of the first embodiment in time-series.

As illustrated in FIG. 7, assume that the printing apparatus 9 is initially installed at a time point T1. In this case, the service personnel performs the operation of requesting the download of the authentication code on the mobile terminal 201. The downloaded authentication code is thereby stored in the storage 90b of the control board 90, the storage 91b of the control board 91, and the storage 92b of the control board 92.

Then, assume that one of the control boards 90 to 92 is replaced with the improper control board in the power-on state at a time point T2. In this case, mounting of the improper control board causes the various sensor detection errors and the communication errors among the control boards, and these errors are stored in the external storage 88 as the piece of log information. However, at the time point T2, since the power is on and it is not the predetermined timing yet, the determiner 104 does not perform matching between the authentication codes written in the respective storages.

Thereafter, the user performs work of cancelling the errors caused by the use of the improper control board, and the printing apparatus 9 recovers at a time point T3.

Then, at a time point T4, the printing apparatus 9 is turned off. When the printing apparatus 9 is turned on at a time point T5, the determiner 104 checks whether the authentication codes stored in the storages 90b, 91b, 92b are all the same or not. In this case, since no proper authentication code is stored in the improper control board replaced at the time point T2, the determiner 104 determines that there is a control board having a storage storing an authentication code different from the other authentication codes.

The execution allowing unit 105 thereby prohibits the execution of printing from the time point T5 onward and the timing changer 107 changes the predetermined timing from the normal timing to the high-frequency timing.

Then, at a time point T6, the improper control board is replaced with the proper control board and the execution allowing unit 105 allows the execution of printing. Hereafter, the determiner 104 performs the matching between the authentication codes at every high-frequency timing.

As described above, in the printing apparatus 9 of the first embodiment, the determiner 104 determines whether the authentication codes written in the storages of the respective control boards attached to the control board attachment portions 96c, 97c, 98c are all the same or not at the predetermined timing and, when the determiner 104 determines that the authentication codes written in the storages are all the same, the execution allowing unit 105 allows the execution of print processing. On the contrary, when the determiner 104 determines that an authentication code different from the other authentication codes exists among the authentication codes written in the storages, the execution allowing unit 105 prohibits the execution of print processing.

Note that, as described above, since each of the CPU 91a and the CPU 92a includes the obtainer 102, the writer 103, the determiner 104, the execution allowing unit 105, the timing changer 107, the log information collector 108, and the code communicator 109, like the CPU 90a, the CPU 90a, the CPU 91a, and the CPU 92a all perform the same print allowing determination processing and send back the same result. For example, assume that the control board 90 is replaced with the improper control board. In this case, for example, no authentication code is stored in the storage of the improper control board replacing the control board 90 and attached to the control board attachment portion 96c. Accordingly, the determiners 104 of the CPU 91a and the CPU 92a both determine that not all of the authentication codes are the same in step S203, and the execution allowing units 105 prohibit the execution of printing.

Even if one of the control boards 90 to 92 is replaced with the improper control board as described above, the execution of print processing can be prohibited because no authentication code is stored or the improper authentication code is stored in the improper control board.

Moreover, as described above, when it is not the predetermined timing yet, the determiner 104 does not determine whether the authentication codes written in the respective storages are all the same or not. Accordingly, if the improper control board is mounted on any of the control board attachment portions 96c, 97c, 98c, the print processing can be continued by use of the improper control board until it is the predetermined timing. However, in this case, there is a possibility of a decrease in print quality of the printed sheet or occurrence of many conveyance troubles such as sheet jam. Accordingly, the CPU 90a, for example, accesses the external storage 88 and the log information collector 108 after occurrence of a trouble and displays a choice of whether to continue the printing or not on the operation panel 97 to allow the user to perform the selection operation, and the user can thereby determine whether to replace the improper control board with the proper control board or to continue using the improper control board while bearing with a low print quality of a printed sheet.

Moreover, the printing apparatus 9 of the first embodiment includes the log information collector 108 which collects the pieces of log information on the printing apparatus 9 and which stores the pieces of log information in the external storage 88 and the timing changer 107 which changes the predetermined timing so as to increase the frequency of the determination by the determiner 104 when an authentication code different from the other authentication codes are included in the authentication codes written in the storages and the piece of log information satisfying the predetermined condition exists in the pieces of log information stored in the external storage 88.

Thus, in the printing apparatus 9 in which the improper control board has been used in the past, the determination by the determiner 104 is performed at high frequency, and mounting of the improper control board can be detected sooner. Hence, it is possible to replace the improper control board with the proper control board and thereby execute the printing without a decrease in quality of the print image.

Note that the timing at which the determiner 104 performs matching between the authentication codes may be reset to the normal timing when the authentication codes are determined to be the same predetermined number of times and a situation where the piece of log information satisfying the predetermined condition is absent continues for a predetermined period after the switching to the high-frequency timing.

Moreover, in the printing apparatus 9 of the first embodiment, when the timing changer 107 determines that the piece of log information satisfying the predetermined condition exists in the read pieces of log information in step S215 (YES), the timing changer 107 notifies the user that the improper control board is mounted, and displays the screen asking the user whether to continue the printing or not, on the liquid crystal display panel 97b (step S217). Then, the CPU 90a determines whether the user has performed the operation of print continuance instruction or not (step S219). However, the present disclosure not limited to this configuration.

The processing in steps S217 and S219 may be omitted such that, when the timing changer 107 determines that the piece of log information satisfying the predetermined condition exists in the read pieces of log information in step S215 (YES), the timing changer 107 changes the predetermined timing in step S201 (step S221) and terminates the processing.

For example, in the embodiment described above, description is given by using the inkjet printing apparatus 9 as an example of the printing apparatus. However, the present disclosure can be applied to other printers such as, for example, a stencil printing machine and an electrophotographic printer.

Second Embodiment

In the first embodiment, when all of the control boards 90, 91, 92 attached to the control board attachment portions 96c, 97c, 98c are replaced with the improper control boards, the print allowing determination processing by the determiner 104, the execution allowing unit 105, the timing changer 107, the log information collector 108, and the code communicator 109 is not executed.

In a second embodiment, a CPU 99 is provided in addition to the control boards 90, 91, 92 attached to the control board attachment portions 96c, 97c, 98c. Description is given of a printing apparatus in which the CPU 99 monitors whether the CPUs of the respective control boards (in the case where no replacement is performed, the CPUs 90a, 91a, 92a of the respective control boards 90, 91, 92) attached to the control board attachment portions 96c, 97c, 98c have executed the print allowing determination processing or not at the predetermined timing, in this case, particularly whether the execution allowing units 105 have either allowed or prohibited the execution of print processing or not.

Figure 8:
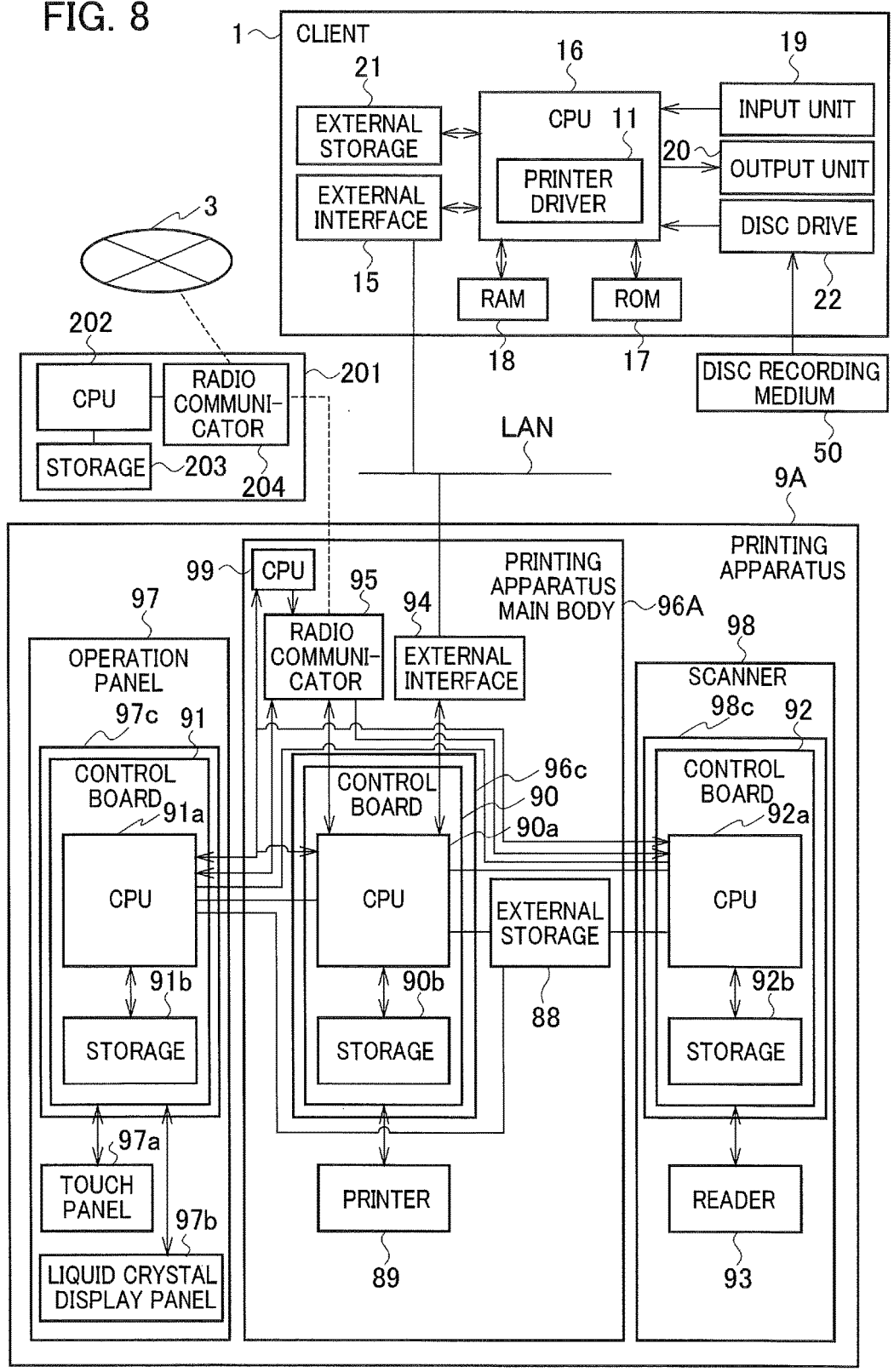
FIG. 8 is an explanatory diagram illustrating a schematic configuration of a printer network system including a printing apparatus in a second embodiment of the present disclosure.

FIG. 8 is an explanatory diagram illustrating a schematic configuration of a printer network system including the printing apparatus 9A of the second embodiment of the present disclosure.

As illustrated in FIG. 8, the printer network system of the second embodiment includes the printing apparatus 9A configured to form an image on a print sheet, the multiple clients 1 (in FIG. 8, only one client 1 is illustrated as a representative) connected to the printing apparatus 9A via the network LAN, and the mobile terminal 201 configured to wirelessly communicate with the printing apparatus 9A. Since the configurations of the clients 1 and the mobile terminal 201 are the same as the configurations of the client 1 and the mobile terminal 201 illustrated in FIG. 1, description thereof is omitted.

The printing apparatus 9A includes the scanner 98, the operation panel 97, and a printing apparatus main body 96A. Note that configurations of the scanner 98, the operation panel 97, and the printing apparatus main body 96A which are also included in the printing apparatus 9 of the first embodiment have the same functions as the configurations in the first embodiment, and description thereof is thus omitted.

The printing apparatus main body 96A includes the CPU 99 which determines whether the execution allowing unit 105 has either allowed or prohibited the execution of print processing or not in each of the CPU 90a, the CPU 91a, and the CPU 92a. Moreover, for example, the CPU 99 has a configuration capable of receiving the print allowing/prohibiting signal from the device communicator 110 of each of the CPU 90a, the CPU 91a, and the CPU 92a.

Then, when the CPU 99 determines that the execution allowing unit 105 has not allowed or prohibited the execution of print processing in none of the CPU 90a, the CPU 91a, and the CPU 92a, the CPU 99 displays an error message on the liquid crystal display panel 97b or sends a mail with an error message via the LAN to notify the user.

Figure 9:
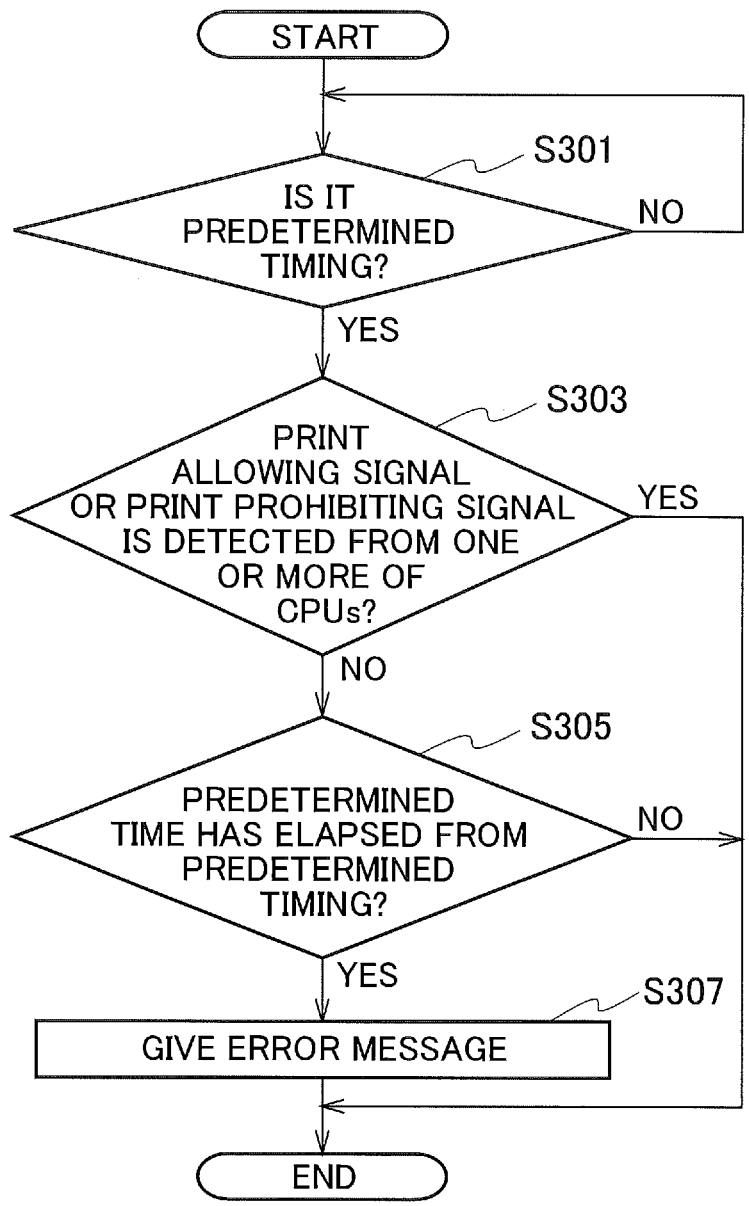
FIG. 9 is a flowchart illustrating monitor processing in the printing apparatus of the second embodiment.

FIG. 9 is a flowchart illustrating monitor processing in the printing apparatus 9A of the second embodiment.

As illustrated in FIG. 9, when it is the predetermined timing (YES in step S301), the CPU 99 determines whether the print allowing/prohibiting signal from one or more of the CPU 90a, the CPU 91a, and the CPU 92a is detected or not (step S303).

When the print allowing/prohibiting signal is detected (YES in step S303), the CPU 99 terminates the monitor processing.

On the contrary, when a predetermined time elapses from the predetermined timing without detection (reception) of the print allowing/prohibiting signal (NO in step S303, YES in step S305), the CPU 99 assumes that all control boards are replaced with the improper control boards and performs the error message notification (S307).

This enables the printing apparatus 9A to notify the user of the error message, for example, when all of the control boards 90 to 92 are replaced with the improper control boards.

Third Embodiment

In the first embodiment, description is given by using, as an example, the printing apparatus 9 in which the control boards 90, 91, 92, respectively, include the CPUs 90a, 91a, 92a configured to perform the print allowing determination processing.

In the third embodiment, a CPU 99B is provided in addition to the control boards 90, 91, 92 attached to the control board attachment portions 96c, 97c, 98c. The CPU 99B performs the print allowing determination processing by comparing the authentication codes stored in the storages (in the case where no replacement is performed, the storages 90b, 91b, 92b) of the control boards attached to the control board attachment portions 96c, 97c, 98c.

Figure 10:
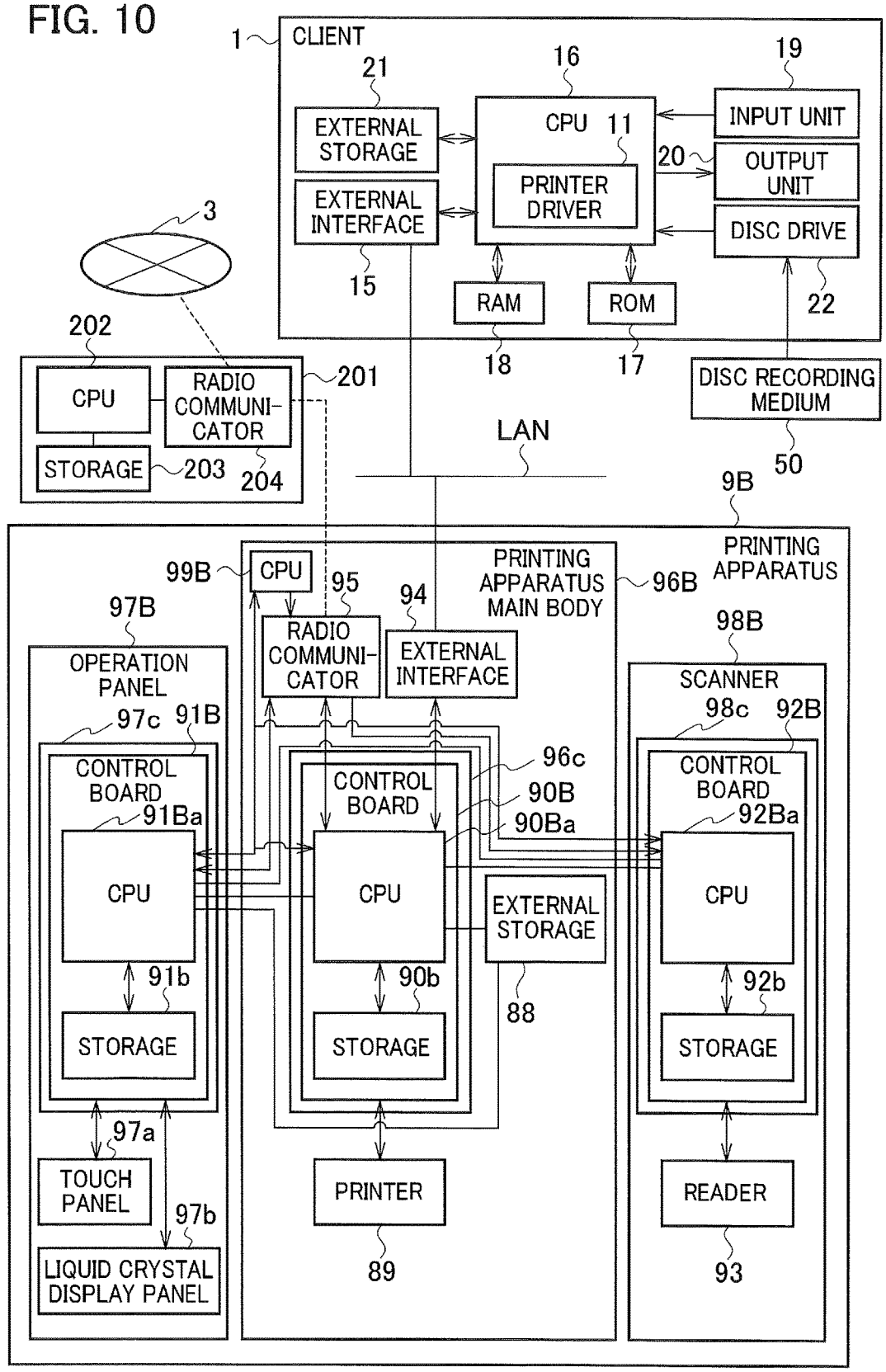
FIG. 10 is an explanatory diagram illustrating a schematic configuration of a printer network system including a printing apparatus of a third embodiment of the present disclosure.

FIG. 10 is an explanatory diagram illustrating a schematic configuration of a printer network system including an inkjet printing apparatus 9B of the third embodiment of the present disclosure.

As illustrated in FIG. 10, the printer network system of the third embodiment includes the printing apparatus 9B configured to form an image on a print sheet, the multiple clients 1 (in FIG. 10, only one client 1 is illustrated as a representative) connected to the printing apparatus 9B via the network LAN, and the mobile terminal 201 configured to wirelessly communicate with the printing apparatus 9B. Since the configurations of the clients 1 and the mobile terminal 201 are the same as the configurations of the client 1 and the mobile terminal 201 illustrated in FIG. 1, description thereof is omitted.

The printing apparatus 9B includes a scanner 98B, an operation panel 97B, and a printing apparatus main body 96B. Note that configurations of the scanner 98B, the operation panel 97B, and the printing apparatus main body 96B which are also included in the printing apparatus 9 of the first embodiment have the same functions as the configurations in the first embodiment, and description thereof is thus omitted.

A control board 90B is attached to the control board attachment portion 96c provided in the printing apparatus main body 96B. The control board 90B includes a CPU 90Ba and the storage 90b.

The CPU 90Ba performs processing related to the image data and various types of processing for operation control of the units and user operations. Moreover, the CPU 90Ba controls operations of the printer 89 based on the program and the setting information stored in the storage 90b.

Furthermore, the CPU 90Ba supplies the authentication code stored in the storage 90b to the CPU 99B according to an instruction of the CPU 99B to be described later.

A control board 91B is attached to the control board attachment portion 97c provided in the operation panel 97B. The control board 91B includes a CPU 91Ba and the storage 91b The CPU 91Ba controls the touch panel 97a and the liquid crystal display panel 97b based on the program stored in the storage 91b.

Moreover, the CPU 91Ba supplies the authentication code stored in the storage 91b to the CPU 99B according to an instruction of the CPU 99B to be described later.

A control board 92B is attached the control board attachment portion 98c provided in the scanner 98B. The control board 92B includes a CPU 92Ba and the storage 92b.

The CPU 92Ba causes the reader 93 to read the image data based on the program stored in the storage 92b.

Moreover, the CPU 92Ba supplies the authentication code stored in the storage 92b to the CPU 99B, according to an instruction of the CPU 99B to be described later.

The printing apparatus main body 96B further includes the CPU 99 which compares the authentication codes stored in the storage 90b, the storage 91b, and the storage 92b.

Configuration on CPU 99B

Figure 11:
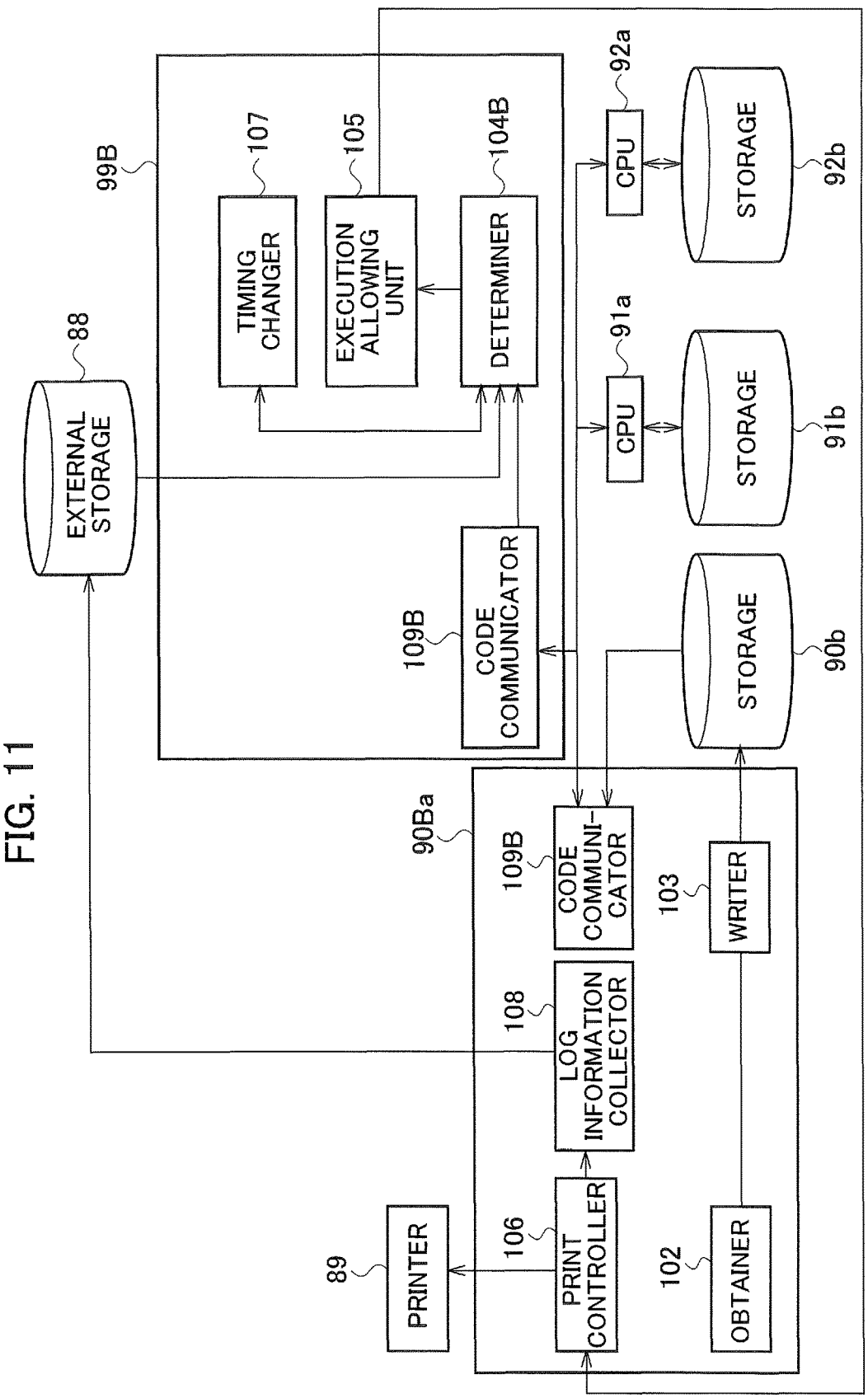
FIG. 11 is a block diagram illustrating an internal configuration which is virtually constructed on a CPU included in the printing apparatus of the third embodiment.

Next, internal blocks on the CPU 99B are described. FIG. 11 is a block diagram illustrating an internal configuration which is virtually constructed on the CPU 99B included in the printing apparatus 9B of the third embodiment of the present disclosure.

As illustrated in FIG. 11, a determiner 104B, the execution allowing unit 105, the timing changer 107, and a code communicator 109B are provided on the CPU 99B. Note that the configurations illustrated in FIG. 11 and denoted by the same reference numerals as those in FIG. 2 have the same functions as the configurations in FIG. 2.

Upon receiving a request from the determiner 104B to obtain the authentication codes at the predetermined timing, the code communicator 109B communicates with the CPUs 90a, 91a, 92a to obtain the authentication codes written in the storages 90b, 91b, 92b of the control boards 90, 91, 92 and supplies the obtained authentication codes to the determiner 104B.

The determiner 104B obtains the authentication codes written in the storages 90b, 91b, 92b of the control boards 90, 91, 92 via the code communicator 109B at the predetermined timing. Then, the determiner 104B determines whether the authentication codes written in the storages 90b, 91b, 92b are all the same or not.

When the determiner 104B determines that the authentication codes written in the storages 90b, 91b, 92b are all the same, the execution allowing unit 105 allows the printer 89 to execute the print processing. On the contrary, when the determiner 104B determines that an authentication code different from the other authentication codes exists among the authentication codes written in the storages 90b, 91b, 92b, the execution allowing unit 105 prohibits the printer 89 from executing the print processing.

For example, the execution allowing unit 105 prohibits the execution of printing by blocking information to and from the control board determined to have the authentication code different from the other authentication codes or by stopping the operation of the external interface 94.

Configuration on CPU 90Ba

Figure 12:
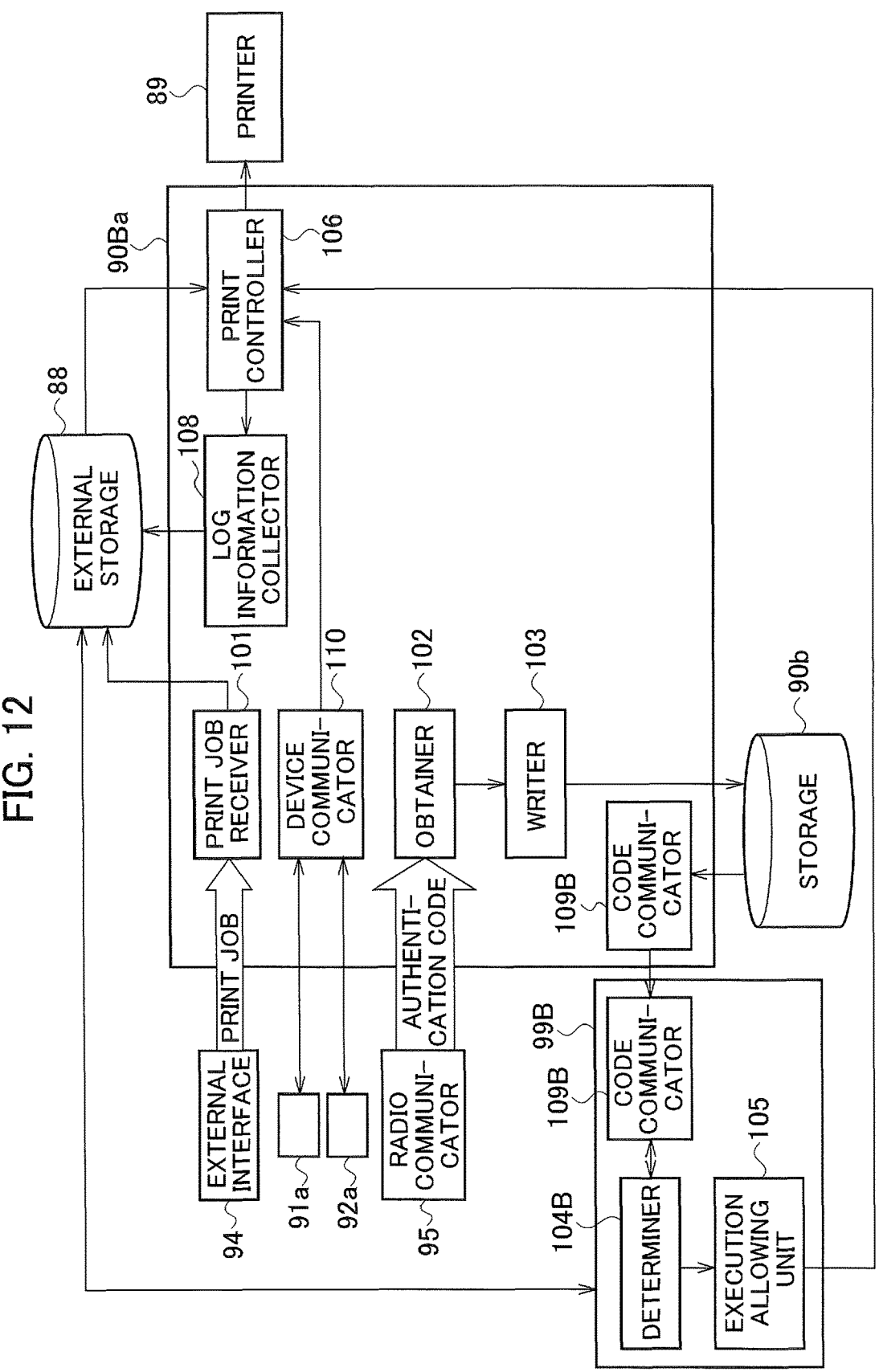
FIG. 12 is a block diagram illustrating an internal configuration which is virtually constructed on a CPU included in the printing apparatus of the third embodiment.

Next, internal blocks on the CPU 90Ba are described. FIG. 12 is a block diagram illustrating an internal configuration which is virtually constructed on the CPU 90Ba included in the printing apparatus 9B of the third embodiment of the present disclosure.

As illustrated in FIG. 12, the print job receiver 101, the obtainer 102, the writer 103, the log information collector 108, the print controller 106, a code communicator 109B, and the device communicator 110 are provided on the CPU 90Ba. Upon receiving the request to send the authentication code from the CPU 99B, the CPU 90Ba supplies the authentication code stored in the storage 90b to the CPU 99B via the code communicator 109B. Note that the internal blocks other than the code communicator 109B have the same functions as the configurations illustrated in FIG. 2 and denoted by the same reference numerals, and description thereof is thus omitted.

Configuration on CPU 91Ba

Next, internal blocks on the CPU 91Ba are described. Although an illustration is omitted, the obtainer 102, the writer 103, the log information collector 108, the code communicator 109B, the device communicator 110, and the operation panel controller 111 are virtually constructed on the CPU 91Ba included in the printing apparatus 9B of the third embodiment of the present disclosure. Upon receiving the request to send the authentication code from the CPU 99B, the CPU 91Ba supplies the authentication code stored in the storage 91b to the CPU 99B via the code communicator 109B. Note that the internal blocks other than the code communicator 109B have the same functions as the configurations illustrated in FIG. 3 and denoted by the same reference numerals, and description thereof is thus omitted.

Configuration on CPU 92Ba

Next, internal blocks on the CPU 92Ba are described. Although an illustration is omitted, the obtainer 102, the writer 103, the log information collector 108, the code communicator 109B, the device communicator 110, and the read controller 112 are virtually constructed on the CPU 92Ba included in the printing apparatus 9B of the third embodiment of the present disclosure. Upon receiving the request to send the authentication code from the CPU 99B, the CPU 92Ba supplies the authentication code stored in the storage 92b to the CPU 99B via the code communicator 109B. Note that the internal blocks other than the code communicator 109B have the same functions as the configurations illustrated in FIG. 4 and denoted by the same reference numerals, and description thereof is thus omitted.

As described above, in the printing apparatus 9B of the third embodiment of the present disclosure, the CPU 99B includes the determiner 104B and the execution allowing unit 105. Accordingly, if any of the control boards 90 to 92 is replaced with an improper control board, no authentication code is stored or an improper authentication code is stored in the improper control board. The execution of print processing can be thus prohibited.

Moreover, if all of the control boards 90 to 92 are replaced with the improper control boards, the CPU 99B prohibits the execution of print processing because no authentication codes are stored or improper authentication codes are stored in the three improper control boards replacing the control boards 90 to 92. Hence, the printing can be executed without a decrease in quality of a print image.

Note that, in the third embodiment, the CPU 99B includes the determiner 104B, the execution allowing unit 105, the timing changer 107, and the code communicator 109B. However, the CPU 90Ba, the CPU 91Ba, and the CPU 92Ba may similarly include the determiner 104B, the execution allowing unit 105B, and the timing changer 107.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A printing apparatus comprising:
   a first control board attachment portion;
   a second control board attachment portion;
   a first control board having a first CPU and a first memory, the first control board being attachable to the first control board attachment portion;
   a second control board having a second CPU and a second memory, the second control board being attachable to the second control board attachment portion; and
   a printer configured to execute a print processing according to an instruction from a third control board attached to the first control board attachment portion the third control board being the first control board or other than the first control board, wherein
   the first CPU is configured to
      obtain an authentication code from an external device electronically communicating with the printing apparatus, the authentication code being used to allow the printer to execute the print processing, and
      write the obtained authentication code into the first memory of the first control board attached to the first control board attachment portion,
   the second CPU is configured to
      obtain the authentication code from at least one of the external device or the first CPU, and
      write the obtained authentication code into the second memory of the second control board attached to the second control board attachment portion, and
   each of the first CPU and the second CPU is configured to perform a first processing including
      at a predetermined timing, determining whether a first authentication code stored in the third control board attached to the first control board attachment portion matches a second authentication code stored in a fourth control board attached to the second control board attachment portion, the fourth control board being the second control board or other than the second control board,
      upon determining that the first authentication code matches the second authentication code, allowing the printer to execute the print processing, and
      upon determining that the first authentication code does not match the second authentication code, prohibiting the printer from executing the print processing.

2. The printing apparatus according to claim 1, further comprising a log information storage mounted on a portion of the printing apparatus other than the first control board and the second control board,
   wherein the first processing further includes
      collecting pieces of log information on the printing apparatus and storing the pieces of log information in the log information storage,
      determining whether a piece of log information satisfying a predetermined condition relating to an error during the print processing by the printer is included in the pieces of log information stored in the log information storage, and
      upon determining that the first authentication code does not match the second authentication code and upon determining that the piece of log information satisfying the predetermined condition is included in the pieces of log information stored in the log information storage, changing the predetermined timing so as to increase frequency of determining whether the first authentication code matches the second authentication code.

3. The printing apparatus according to claim 1, further comprises:
   a third CPU mounted on a portion of the printing apparatus other than the first control board and the second control board and configured to perform a second processing including
      at a predetermined timing, determining whether a determination whether the first authentication code stored in the third control board attached to the first control board attachment portion matches the second authentication code stored in the fourth control board attached to the second control board attachment portion has been performed, and
      upon determining that the determination whether the first authentication code matches the second authentication code has not been performed, prohibiting the printer from executing the print processing.

4. The printing apparatus according to claim 3, further comprising a log information storage mounted on a portion of the printing apparatus other than the first control board and the second control board,
   wherein the first processing further includes
      collecting pieces of log information on the printing apparatus and storing the pieces of log information in the log information storage,
      determining whether a piece of log information satisfying a predetermined condition relating to an error during the print processing by the printer is included in the pieces of log information stored in the log information storage, and
      upon determining that the first authentication code does not match the second authentication code and upon determining that the piece of log information satisfying the predetermined condition is included in the pieces of log information stored in the log information storage, changing the predetermined timing so as to increase frequency of determining whether the first authentication code matches the second authentication code.

5. A printing apparatus comprising:
   a first control board attachment portion;
   a second control board attachment portion;
   a first control board having a first CPU and a first memory, the first control board being attachable to the first control board attachment portion;

a second control board having a second CPU and a second memory, the second control board being attachable to the second control board attachment portion;

a printer configured to execute a print processing according to an instruction from a third control board attached to the first control board attachment portion, the third control board being the first control board or other than the first control board; and a third CPU mounted on a portion of the printing apparatus other than the first control board and the second control board, wherein the first CPU is configured to
obtain an authentication code from an external device electronically communicating with the printing apparatus, the authentication code being used to allow the printer to execute the print processing, and
write the obtained authentication code into the first memory of the first control board attached to the first control board attachment portion, the second CPU is configured to
obtain the authentication code from at least one of the external device or the first CPU, and
write the obtained authentication code into the second memory of the second control board attached to the second control board attachment portion, and the third CPU is configured to perform a first processing including
at a predetermined timing, determining whether a first authentication code stored in the third control board attached to the first control board attachment portion matches a second authentication code stored in a fourth control board attached to the second control board attachment portion, the fourth control board being the second control board or other than the second control board,
upon determining that the first authentication code matches the second authentication code, allowing the printer to execute the print processing, and
upon determining that the first authentication code does not match the second authentication code, prohibiting the printer from executing the print processing.

6. The printing apparatus according to claim 5, further comprising a log information storage mounted on a portion of the printing apparatus other than the first control board and the second control board, wherein the first processing further includes
collecting pieces of log information on the printing apparatus and storing the pieces of log information in the log information storage,
determining whether a piece of log information satisfying a predetermined condition relating to an error during the print processing by the printer is included in the pieces of log information stored in the log information storage, and
upon determining that the first authentication code does not match the second authentication code and upon determining that the piece of log information satisfying the predetermined condition is included in the pieces of log information stored in the log information storage, changing the predetermined timing so as to increase frequency of determining whether the first authentication code matches the second authentication code.

* * * * *